US009449256B1

(12) United States Patent
Krishnaswamy et al.

(10) Patent No.: US 9,449,256 B1
(45) Date of Patent: *Sep. 20, 2016

(54) PROVIDING IMAGE CANDIDATES BASED ON DIVERSE ADJUSTMENTS TO AN IMAGE

(71) Applicant: Google Inc., Mountain View, CA (US)

(72) Inventors: Aravind Krishnaswamy, San Jose, CA (US); Nicholas Butko, Mountain View, CA (US); Timothy S. St Clair, San Francisco, CA (US)

(73) Assignee: Google Inc., Mountain View, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/530,053

(22) Filed: Oct. 31, 2014

Related U.S. Application Data

(63) Continuation of application No. 13/633,079, filed on Oct. 1, 2012, now Pat. No. 8,908,987.

(51) Int. Cl.
*G06K 9/62* (2006.01)
*G06T 5/00* (2006.01)

(52) U.S. Cl.
CPC .......... *G06K 9/6215* (2013.01); *G06K 9/6218* (2013.01); *G06T 5/001* (2013.01)

(58) Field of Classification Search
CPC .......... G06K 9/6218; G06K 2209/01; G06K 9/00711; G06K 9/38; G06T 7/0081
USPC ....... 382/225, 174, 254, 260, 263, 264, 274; 348/221.1, 256, 603; 355/35; 345/77, 345/617
See application file for complete search history.

(56) References Cited

U.S. PATENT DOCUMENTS

| | | |
|---|---|---|
| 6,816,191 B1 | 11/2004 | Shyu |
| 7,054,484 B2 | 5/2006 | Lyford |
| 7,978,938 B1 | 7/2011 | Wilensky |
| 8,290,206 B1 | 10/2012 | Meyers |
| 8,345,057 B2 | 1/2013 | Ptucha et al. |
| 8,417,046 B1 | 4/2013 | McDougal et al. |
| 2002/0069218 A1 | 6/2002 | Sull et al. |
| 2003/0012436 A1 | 1/2003 | Lyford |
| 2006/0112033 A1 | 5/2006 | Vion |
| 2007/0288432 A1 | 12/2007 | Weltman et al. |

(Continued)

OTHER PUBLICATIONS

Bychkovsky S. et al.; "Learning Photographic Global Tonal Adjustment With A Database of Input/Output Image Pairs"; IEEE Computer Vision and Pattern Recognition (CVPR); Jun. 2011; pp. 97-104.*

(Continued)

*Primary Examiner* — Gregory F Cunningham
(74) *Attorney, Agent, or Firm* — IP Spring

(57) ABSTRACT

In some implementations, a method provides image candidates for a user. The method can include applying a plurality of different image adjustment types to an image to produce a plurality of different adjusted images. A score is determined for each of the adjusted images, where each score is based on previous selections by a plurality of persons of other images having one or more characteristics similar to the adjusted images. The method determines one or more candidate images for presentation to a particular user, where each candidate image is obtained from one of the different image adjustment types. The candidate images are determined based on the scores of the adjustment types.

20 Claims, 6 Drawing Sheets

(56) References Cited

U.S. PATENT DOCUMENTS

2008/0317376 A1 12/2008 Kasperkiewicz
2009/0169073 A1 7/2009 Areste et al.
2012/0155765 A1 6/2012 Joshi et al.
2013/0035114 A1 2/2013 Holden

OTHER PUBLICATIONS

Jung, Tae-Min et al.; "Mobile Interface for Adaptive Image Refinement Using Interactive Evolutionary Computing" WCCI 2010 IEEE World Congress on Computational Intelligence; Jul. 18-23, 2010; pp. 3277-3283.*

* cited by examiner

PROVIDING IMAGE CANDIDATES BASED ON DIVERSE ADJUSTMENTS TO AN IMAGE

CROSS REFERENCE TO RELATED APPLICATION

This application is a continuation of and claims priority to U.S. application Ser. No. 13/633,079 filed Oct. 1, 2012, which is hereby incorporated by reference as if set forth in full in the application for all purposes.

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images of many different subjects for themselves and others to see. Some applications and devices provide an automated correction function, in which the appearance of an image is analyzed using particular techniques such as a histogram analysis of the image, and an altered image including changes based on the analysis is provided for the user. For example, such image characteristics as contrast, exposure, or brightness can be changed or corrected by these functions. Some systems allow a user to select his or her own stylistic changes to images, such as altering an image through a function to change a color scheme or other properties of the image to obtain a desired visual style. However, such functions are often limited since they bias the editing process to a particular starting point, and/or often produce altered images unsatisfying to the user.

SUMMARY

Implementations of the present application relate to providing image candidates based on diverse adjustments to an image. In some implementations, a method includes applying a plurality of different image adjustment types to an image to produce a plurality of different adjusted images. The method determines a score for each of the adjusted images, where each score is based on previous selections by a plurality of persons of other images having one or more characteristics similar to the adjusted images. The method determines one or more candidate images for presentation to a particular user, where each candidate image is obtained from one of the different image adjustment types. The candidate images are determined based on the scores of the adjustment types.

Various implementations and examples of the above method are described. The one or more candidate images can be a subset of the adjusted images and one of more of the candidate images can be associated with the highest scores. The different image adjustment types can perform adjustments to image visual characteristics which can include image sharpness, brightness, contrast, exposure level, shadow level, highlight level, clarity, vibrance, and/or saturation. The different image adjustment types can include stylistic filters or presets that adjust the image to different visual styles.

In some implementations, the method can determine the different image adjustment types to apply to the image. In various examples, this can include examining previous adjustment types applied to image visual characteristics of other images by users of a social networking system, and using the previous adjustment types as adjustment types for the current image. Such examining of previous adjustment types can include examining combinations of multiple image visual characteristic adjustments that were most often previously preferred by the users in the other images, and designating each of one of more of the combinations as its own adjustment type. In another example, determining the different image adjustment types can include examining previous adjustment types that the particular user has previously preferred or approved, and including those previous adjustment types in the image adjustment types for the current image. In another example, determining the different image adjustment types can include determining content depicted in the image, searching for other images having matching depicted content, determining previous image adjustment types applied to the other images by users of a social networking system, and including those previous adjustment types in the different image adjustment types applied to the current image. In another example, determining the different image adjustment types can include clustering data representing a plurality of previous image adjustment types applied by one or more users of a social networking service, and using the clustered data to determine one or more of the different image adjustment types.

The above method can determine the scores based on data describing selections indicating preferences of the multiple persons for characteristics of images, where the characteristics can include types of content depicted in images and visual form characteristics of images. The method can use optimization techniques to further iteratively adjust at least one of the adjusted images to increase the score of the adjusted image and/or its adjustment type. Determining a score for each adjustment type can include determining which previous user adjustments to image visual characteristics in other images that the user has previously approved and increasing the score of the image adjustment types matching the previous user adjustments.

In some implementations of the above method, the applying of different image adjustment types and the determination of score of each adjustment type can be performed for multiple images in a pre-processing stage. The method can then obtain a subject image and apply at least some of the different image adjustment types to the subject image as subject adjustment types. The subject adjustment types can be determined based on the scores of the adjustment types that were commonly applied to those of the multiple images having visual characteristics similar to those of the subject image. The candidate images can be derived from the applying of the subject adjustment types to the subject image. In some implementations, the scores are associated with subject descriptors describing the visual characteristics of the subject image. The subject descriptors are matched with stored descriptors derived from the pre-processed multiple images, and each of the stored descriptors is associated with an adjustment type and a score pertaining to the suitability of the combination of the stored descriptor and adjustment type when applied to any image.

In some implementations, a method can include determining a plurality of different image adjustment types based on preferences of a plurality of users for previous adjustments to a plurality of images and based on preferences of a particular user for previous adjustments to one or more images. The method can apply the different image adjustment types to an original image to produce a plurality of different adjusted images. Each adjusted image can be evaluated to determine a score for each of the adjusted images, where each score is based on previous selections by a plurality of persons of other images having one or more characteristics similar to the adjusted images. The method can determine one or more candidate images that are a subset of the adjusted images and one or more of which have the highest scores. The method enables the candidate images to be presented to the particular user.

In some implementations, a system can include a storage device and at least one processor accessing the storage device and operative to perform operations. The operations include applying a plurality of different image adjustment types to an image to produce a plurality of different adjusted images. The operations can determine a score for each of the adjustment types, where each score is based on previous selections by a plurality of persons of other images having one or more characteristics similar to the adjusted images. The operations determine one or more candidate images for presentation to a particular user, each candidate image obtained from one of the different image adjustment types, where the candidate images are determined based on the scores of the adjustment types.

In various implementations and examples of the above system, the candidate images can be a subset of the adjusted images and one of more of the candidate images can be associated with the highest scores. The operations can further comprise determining the plurality of different image adjustment types to apply to the image, including examining previous adjustment types applied to image visual characteristics of other images by a plurality of users of a social networking system, and providing the previous adjustment types in the image adjustment types for the image. The scores can be based on data describing selections indicating preferences of the multiple persons for characteristics of images, where the characteristics can include types of content depicted in images and visual form characteristics of images.

DETAILED DESCRIPTION

Figure 1:
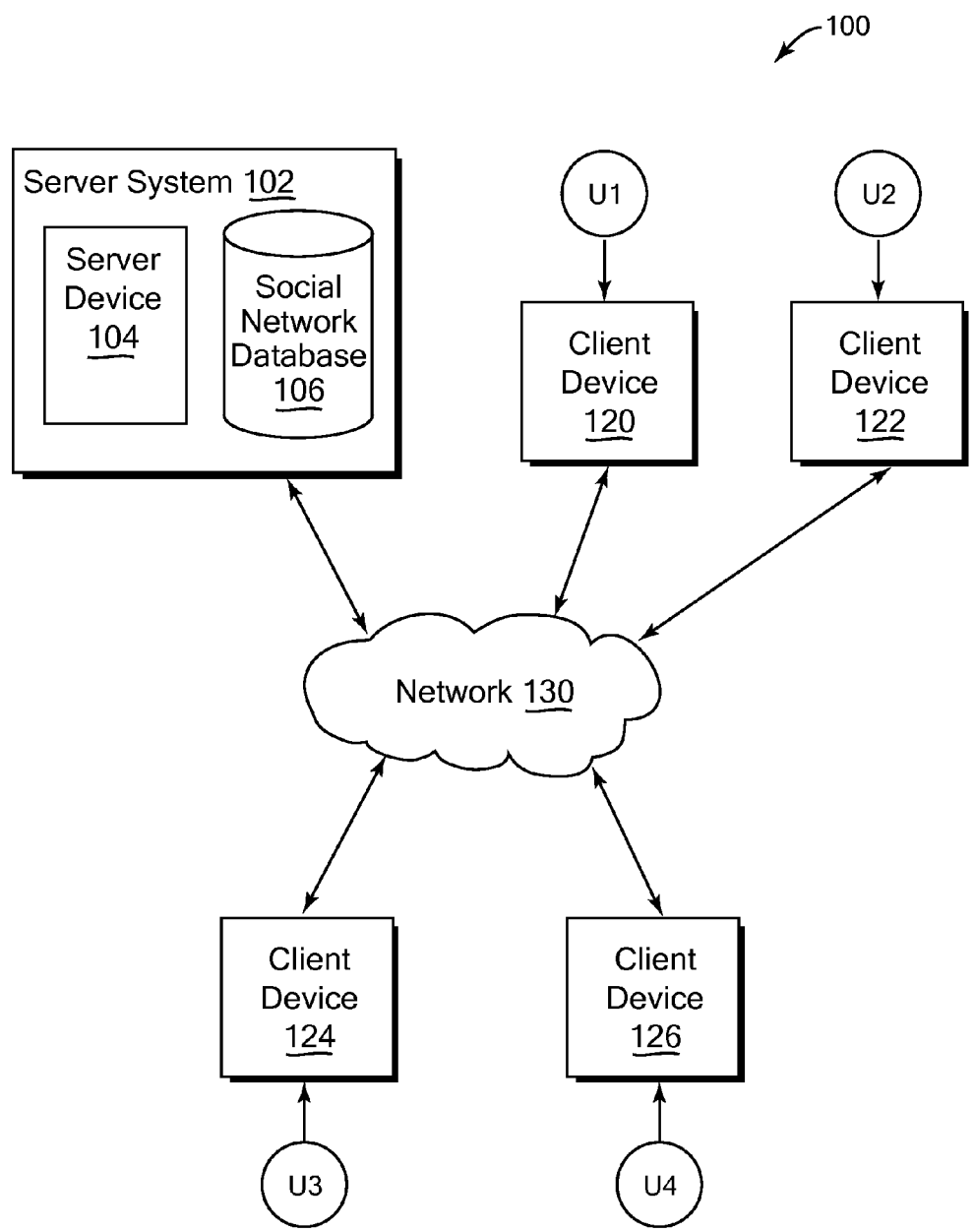
FIG. 1 is a block diagram of an example network environment which may be used for one or more implementations described herein.

One or more implementations described herein relate to providing high quality image candidates to a user based on diverse adjustments to an image. Various implementations apply a number of different adjustment types to an original image and present a subset of resulting candidate adjusted images to a user, allowing the user to select preferred adjustments to the original image. In some implementations, the system can determine the candidate images as those adjusted images associated with the highest scores, where the scores are based on previous selections and judgments of persons as to a quality of images having one or more characteristics similar to of the adjusted images. These features lead to producing desirable, high quality, highly tailored, and appropriate adjustments to images for a user.

The system can perform image adjustments that can include image correction and/or "autofix," which can correct visual form characteristics of an image such as brightness, contrast, blurriness, exposure level, shadows, highlights, clarity, vibrance, and saturation. Image adjustments can also or alternatively include stylistic adjustments, such as those provided by image filters, presets or special effects, e.g., stylistic changes of an image's colors to black and white, sepia tones, or another color scheme, and/or changing of other image characteristics to provide a particular style.

In some implementations, the system can determine the types of image adjustments to apply to the original image. The system can examine the preferences for image adjustments of users of the system, including preferences of general users as well as preferences of the particular user, where the preferred adjustment types are included in the determined adjustment types for the original image. The system applies image adjustment types to the original image to obtain several different adjusted images. In some implementations, the system can evaluate each adjusted image and determine a score for each adjusted image. The score can be based on selections indicating the judgment of persons as to a quality of other images having one or more characteristics similar to the adjusted images. For example, the score can represent the general appeal of the image to people based on the characteristics of the image such as visual form characteristics and types of visual content depicted in the adjusted images. The scores can be influenced by previous preferences or approvals of the particular user for particular image content or characteristics.

The system determines one or more candidate images for presentation to a user based on the scores of the adjusted images. Each candidate image is obtained from a different image adjustment type. In some implementations, the candidate images are a subset of the adjusted images and one or more of the candidates have the highest scores. Some examples can apply a diversity metric to the candidate images to provide greater differences in visual appearance between the candidate images. In some implementations, a system can present the candidate images to the particular user and allow the user to select one or more of the images as preferred by the user. Particular user selection of certain image adjustments can be used to increase the quality score of the associated image adjustment types, allowing the system to adapt to user selections over time.

In some implementations, the method can apply adjustment types to multiple images in a pre-processing stage to obtain several adjusted images. The pre-processing stage can establish correlations between adjustment types and image visual characteristics such as content and form characteristics. In some examples, descriptors of content and visual form characteristics of the multiple images can be generated, and the system can store combinations of descriptors with adjustment types and the associated scores. At run time, the system receives a subject image and similarly generates descriptors of visual characteristics of the subject image. The system matches the subject image descriptors to stored descriptors of the pre-processed adjusted images, and uses the associated scores to determine which of the pre-processed image adjustment types are to be applied to the subject image to create candidate images to present to the user. User selection of candidate images can also be used over time to increase the score of the associated image adjustment types.

Users thus can obtain and select from adjusted candidate images which have a higher occurrence of desirable changes. Candidate images are produced from processes that can apply many and diverse adjustments to images, providing a wide range of adjustments from which the user can choose. User preferences and selections of various images assist in narrowing a large number of adjusted images to a smaller number of selected candidates easily viewed and evaluated by a particular user. For example, the particular user can be presented with one or more candidate adjusted images which have more appropriate and pleasing images to that user, based on the judgments of the particular user and/or other users in general. These features allow a user to be presented with viable corrections and stylistic changes to images with a minimum of time and effort expended by the user.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a social network database 106 or other storage device. Network environment 100 also can include one or more client devices, such as client devices 120, 122, 124, and 126, which may communicate with each other via network 130 and server system 102. Network 130 can be any type of communication network, including one or more of the Internet, local area networks (LAN), wireless networks, switch or hub connections, etc.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, social network database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with each other using respective client devices 120, 122, 124, and 126, and respective to features described herein each user can receive messages and notifications via a social network service implemented by network system 100. In one example, users U1, U2, U3, and U4 may interact with each other via the social network service, where respective client devices 120, 122, 124, and 126 transmit communications and data to one or more server systems such as system 102, and the server system 102 provides appropriate data to the client devices such that each client device can receive shared content uploaded to the social network service via the server system 102.

The social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post content including text, images, video sequences, audio sequences or recordings, or other types of content for access by designated sets of users of the social network service, send multimedia information and other information to other users of the social network service, participate in live video, audio, and/or text chat with other users of the service, etc. For example, a user can designate one or more user groups, such as "friends lists," family lists, occupation lists, etc., to allow users in the designated user groups to access or receive content and other information associated with the user on the social networking service. In some implementations, the access of users to user information can be designated in terms of larger groups, such as a "public" setting designating all the users of the social network service. As used herein, the term "social networking service" can include a software and/or hardware system that facilitates user interactions, and can include a service implemented on a network system. In some implementations, a "user" can include one or more programs or virtual entities, as well as persons that interface with the system or network.

A social networking interface, including display of content and communications, privacy settings, notifications, and other features described herein, can be displayed using software on the client device, such as application software or client software in communication with the server system. The interface can be displayed on an output device of the client device, such as a display screen. For example, in some implementations the interface can be displayed using a particular standardized format, such as in a web browser or other application as a web page provided in Hypertext Markup Language (HTML), Java™, JavaScript, Extensible Markup Language (XML), Extensible Stylesheet Language Transformation (XSLT), and/or other format.

Other implementations can use other forms of systems instead of social networking services and systems. For example, users accessing any type of computer network can make use of features described herein. Some implementations can provide features described herein on client or server systems disconnected from or intermittently connected to computer networks.

Figure 2:
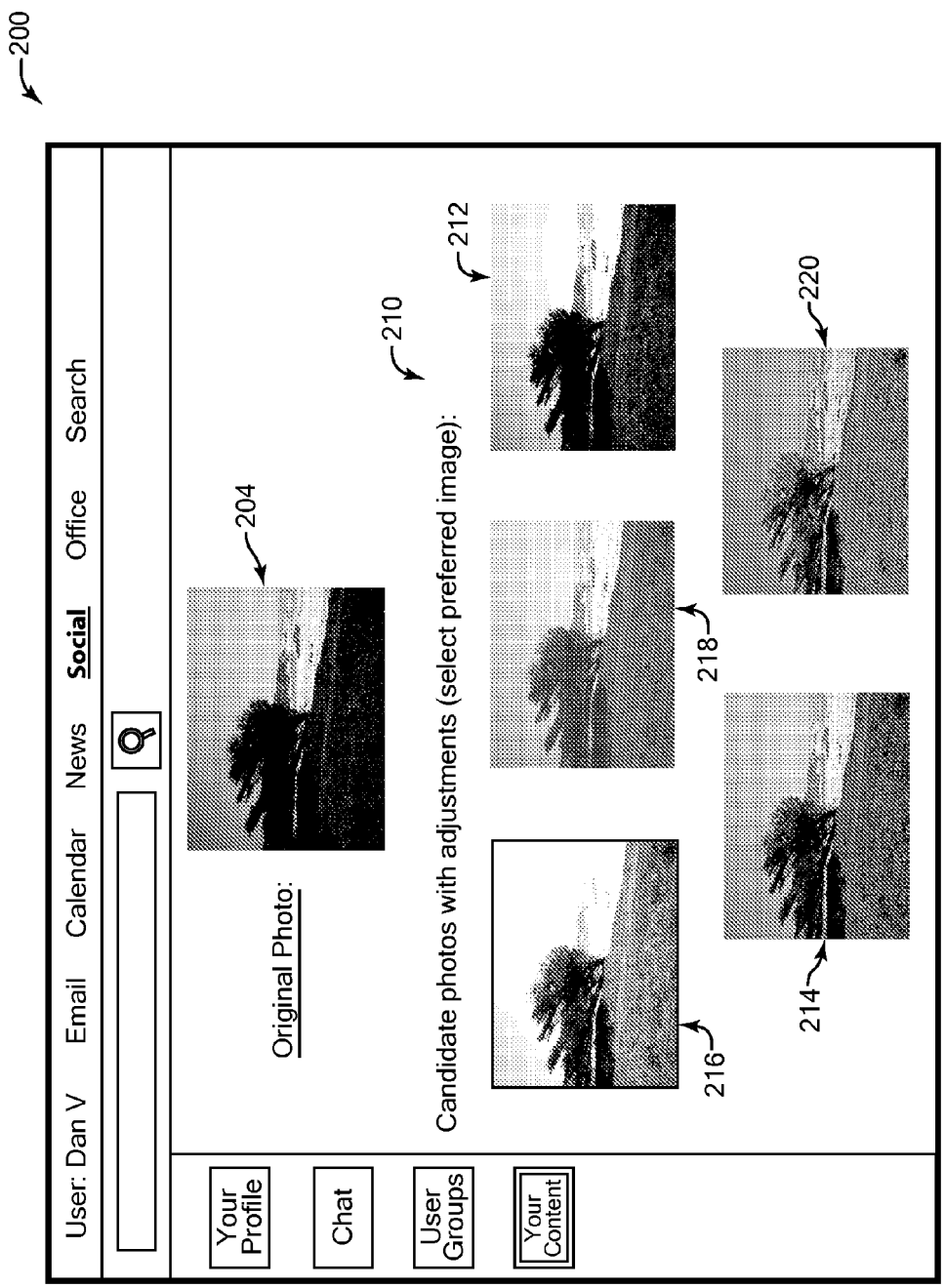
FIG. 2 is illustration of an example graphical user interface (GUI) displaying an original image adjusted to provide multiple candidate images according to some implementations.

FIG. 2 is a diagrammatic illustration of an example simplified graphical interface (GUI) 200 displaying an image adjusted with multiple different adjustment types to provide candidate images, according to some implementations. GUI 200 can be displayed on a display device, e.g., of a client device 120, 122, 124, and/or 126, or a server system 102 in some implementations. In the present example, a user is viewing images on the interface 200 for a social networking service.

In the current example, the system displays an original image 204 in a display area 206 of the interface 200. The original image 204 can be stored on one or more storage devices accessible to the social network service, such as on the social network database 106. For example, the user may have uploaded the image 204 to the social networking service, or otherwise provided the image for his or her account. In the example of FIG. 2, the original image 204 is a digital image, such as a photograph taken by a camera.

In the example of FIG. 2, the original image 204 has been analyzed by the system (which can be the social networking service, one or more server systems, and/or one or more client devices in various embodiments) using features described below. After the analysis, a number of candidate images 210 are produced and displayed to the user. These candidate images are the results of applying different adjustment types to the original image and the candidate images are selected as likely to be desirable to the user.

In the example of FIG. 2, the candidate images 210 present different adjustments to the original image. Such adjustments can include changes to the visual form characteristics of the image, including contrast, brightness, saturation, exposure, sharpness, shadows, highlights, and/or vibrance. Each resulting candidate image 210 includes one or more different adjustments based on a different adjustment type. In some implementations, the adjustments can include changes to visual form characteristics like brightness, contrast, saturation, exposure, clarity, sharpness, and/ or any combination of such characteristics. Thus, for example, one adjustment type has changed candidate image 212 to have a higher exposure level than the original image 204, and another adjustment type has changed candidate image 214 to have a lower shadow level than the original image. Adjustment types can also be combinations of one or more individual adjustments to image characteristics. For example, one adjustment type has changed candidate image 216 to have its brightness adjusted higher and its contrast adjusted higher than the original image, while another adjustment type has changed candidate image 218 to have its brightness adjusted higher and its contrast adjusted lower. Another adjustment type has similarly changed candidate image 220 to have both its shadow and highlight levels lowered. (Color-related adjustments are not shown, as the figure is provided without color.) In some implementations, the selection of candidate images to present to the user is made from a larger number of adjusted images, and the selections are determined based on a variety of user data, including data derived from selections and judgments of various people or users as to the quality of images having one or more of the same characteristics as the adjusted images. The user data can also include the preferences and judgments of the particular user viewing the interface 200 and the candidate images. Thus the visual quality of candidate images 210 can be generally high, and the candidate images can be visually diverse to present varied choices to the user (exaggerations to adjustments are shown in FIG. 2 to demonstrate such adjustments).

In some implementations or modes, the candidate images presented by the adjustment process can be changed to a different visual style of the original image. For example, stylistic filters or presets can be applied to the original image to change the color scheme of the original image and present candidates that are black and white, sepia toned, have an "aged" look with faded colors and features, or provide a different color style. The visual style can also or alternatively be adjusted by changing other features of the image, such as blurring sharp lines, changing the curvature of lines, scaling portions of the image, etc. The stylistic adjustment types used to provide the candidate images 210 can be already known by the system or can be determined by the system based on user preferences and analysis of the original image. Various embodiments describing the determination of adjustment types and determination of candidate images are described below.

The user can select one of the candidate images 210 as a preferred adjustment to the original image. In some implementations, the user can select multiple candidate images, e.g., provide a ranking of the adjustments as preferred by the user. In some implementations, the system can store the user selections for later use as a factor in determining appropriate candidate images. After the user selects a candidate image, in some implementations the system can replace the original image with the selected candidate image. Some implementations can publish the selected candidate image on the social networking service in place of the original image or as a new image if it is not already so published.

Figure 3:
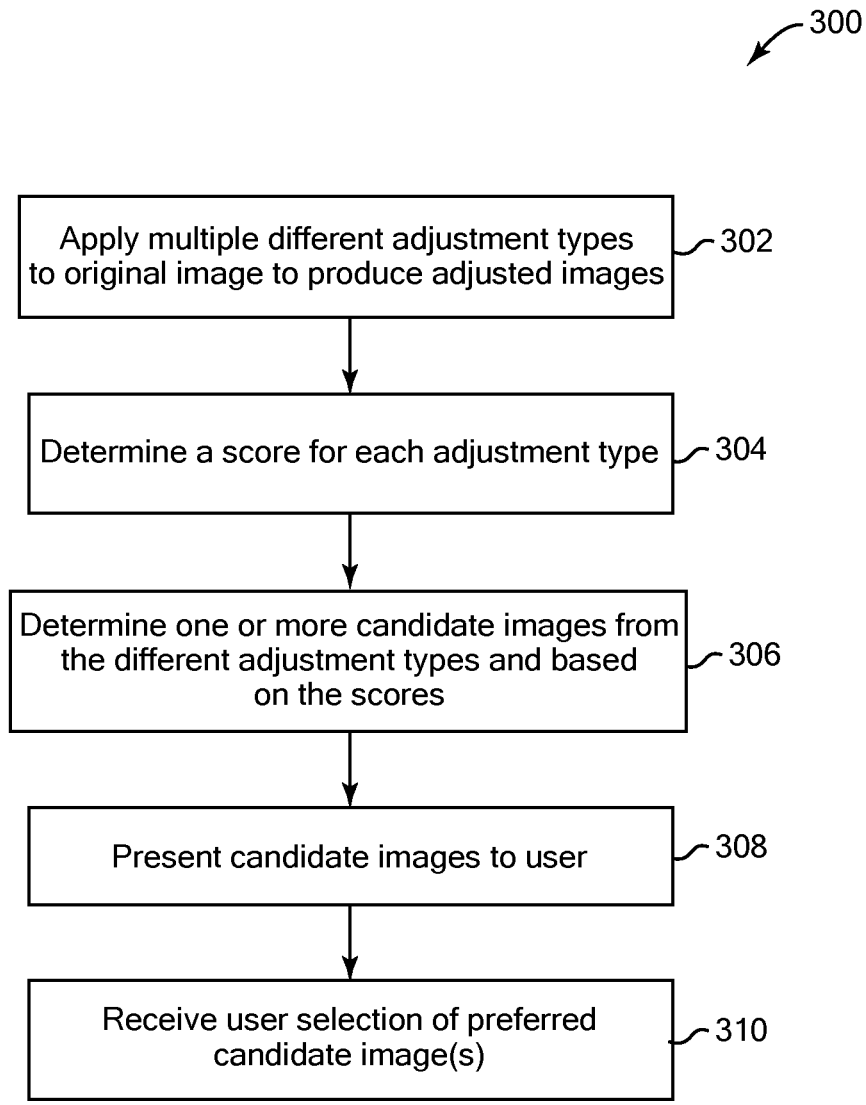
FIG. 3 is a flow diagram illustrating an example method of a method of providing image candidates based on diverse adjustments to an image, according to some implementations.

FIG. 3 is a flow diagram illustrating one example of a method 300 of providing image candidates based on diverse adjustments to an image. In some implementations, method 300 can be implemented, for example, on a server system 102 as shown in FIG. 1. In described examples, the server system includes one or more processors or processing circuitry, and one or more storage devices such as a database 106. In some implementations, different components of a server and/or different servers can perform different blocks or other parts of the method 300. In other implementations, some or all of the method 300 can be implemented on one or more client devices. Method 300 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 300 can be performed as part of or component of an application running on the client device, or as a separate application or software running in conjunction with other applications and operating system.

The method 300 can be initiated by a particular user who is to receive candidate images provided by the method. The particular user may, for example, have selected the initiation of the method 300 from an interface such as a social networking interface or other graphical interface. In some implementations, the method 300 can be initiated automatically by the system, such as by scanning content or albums of one or more users and automatically displaying and/or storing one or more candidate images for the user. For example, one candidate image can be provided as a single result of the method, or multiple candidate images can be provided for immediate or later viewing and selection by a user.

In block 302 of method 300, the method applies multiple different adjustment types to an original image to produce multiple different adjusted images. An "adjustment type," when referred to herein, can be function that performs a visual adjustment to an image, where some adjustment types may perform an adjustment to a single visual characteristic while other adjustment types may perform adjustments to a combination of two or more visual characteristics of an image. In some examples, the method can apply adjustment types to the original image in parallel or partially in parallel, allowing faster processing. The different adjustment types can adjust one or more visual form characteristics of the original image, such as brightness, contrast, sharpness, clarity, saturation, etc. In some implementations, the adjustment types can adjust visual form characteristics that are visual style characteristics of the original image, such as by changing a color scheme and/or other features of the original image (e.g., produce a sepia toned look, an aged photograph look with muted colors, a washed-out look, a black and white look, etc.). In some implementations, the different adjustment types to apply can be determined and selected by the method based on the original image and based on other data, such as user data describing previous selections and/or judgments of other users and/or the particular user. Some examples of determining adjustment types are described below with respect to FIG. 4. Some implementations can use known and/or previously-determined adjustment types to apply. In other implementations, the adjustment types that are applied can be selected outside method 300, such as by persons, users, or other processes.

In block 304, the method determines a rating or score for each adjustment type, where the score can be relative to a predetermined scale. In some embodiments, such as described below for FIG. 4, the method can evaluate and determine scores for the adjusted images produced by the adjustment types, thereby evaluating and scoring the adjustment types. In other embodiments, the method can evaluate and determine scores for the adjustment types without evaluating and scoring the adjusted images, as in examples described below with respect to FIG. 5.

The evaluation and score determination can be implemented in various ways. In some implementations, each determined score can be based on previous selections by multiple persons, where those selections were of other images that have one or more characteristics similar to the adjusted images. For example, in some implementations the score can be based on data describing results by multiple persons that reflect their previous selections of various images based on judgments of those persons as to the visual quality of those images, and where those images have one or more characteristics that are the same as or similar as in the adjusted images. Such results can be correlated to the current adjusted images to score the adjusted images. Some implementations can use previous selections or preferences of the particular user for other images with same or similar characteristics as the adjusted images, as a factor in determining the scores of the adjusted images. Some implementations can use previous judgments of persons as to which adjustment types provide preferred adjusted images. In some implementations, the method can further adjust the adjusted images to optimize for a higher score using iterative techniques. Various implementations of evaluating and scoring the adjusted images are described below.

In block 306, the method determines one or more candidate images from the different adjustment types and based on the scores determined previously. For example, in some implementations, the one or more candidate images can be a subset of the adjusted images, such as the adjusted images associated with the best scores determined previously, as described in the examples of FIG. 4. Some implementations can provide the one or more candidate images by applying one or more high-scoring adjustment types that previously produced images having similar extracted descriptors as the original image, as described in examples of FIG. 5. Some implementations provide a much lower and manageable number of candidate images to present to the user than the number of adjusted images produced in block 302.

In block 308, the method presents the candidate images to the particular user. For example, as shown in FIG. 2, the candidate images can be displayed in a graphical interface of a system, such as an interface used for a social network service or other system. Some implementations can present the candidate images to one or more other users for selection, such as other users of a social networking service. In some implementations, the candidate images need not be displayed or presented to the user, and can be stored for later viewing or use by the particular user, for example.

In block 310, the method can receive one or more selections of the candidate images by the particular user. For example, the particular user can select the candidate image that is most preferred by the user. In some implementations, the particular user can rank the candidate images from best to worst and/or provide other ranking or rating information. The user's selection and/or ranking information can be stored by the system and used in some implementations as a factor in determination of adjustment types and/or evaluation of adjusted images for later original images subjected to method 300. Some implementations that present the candidate images to other users can receive similar selections and/or ranking information from those other users.

Figure 4:
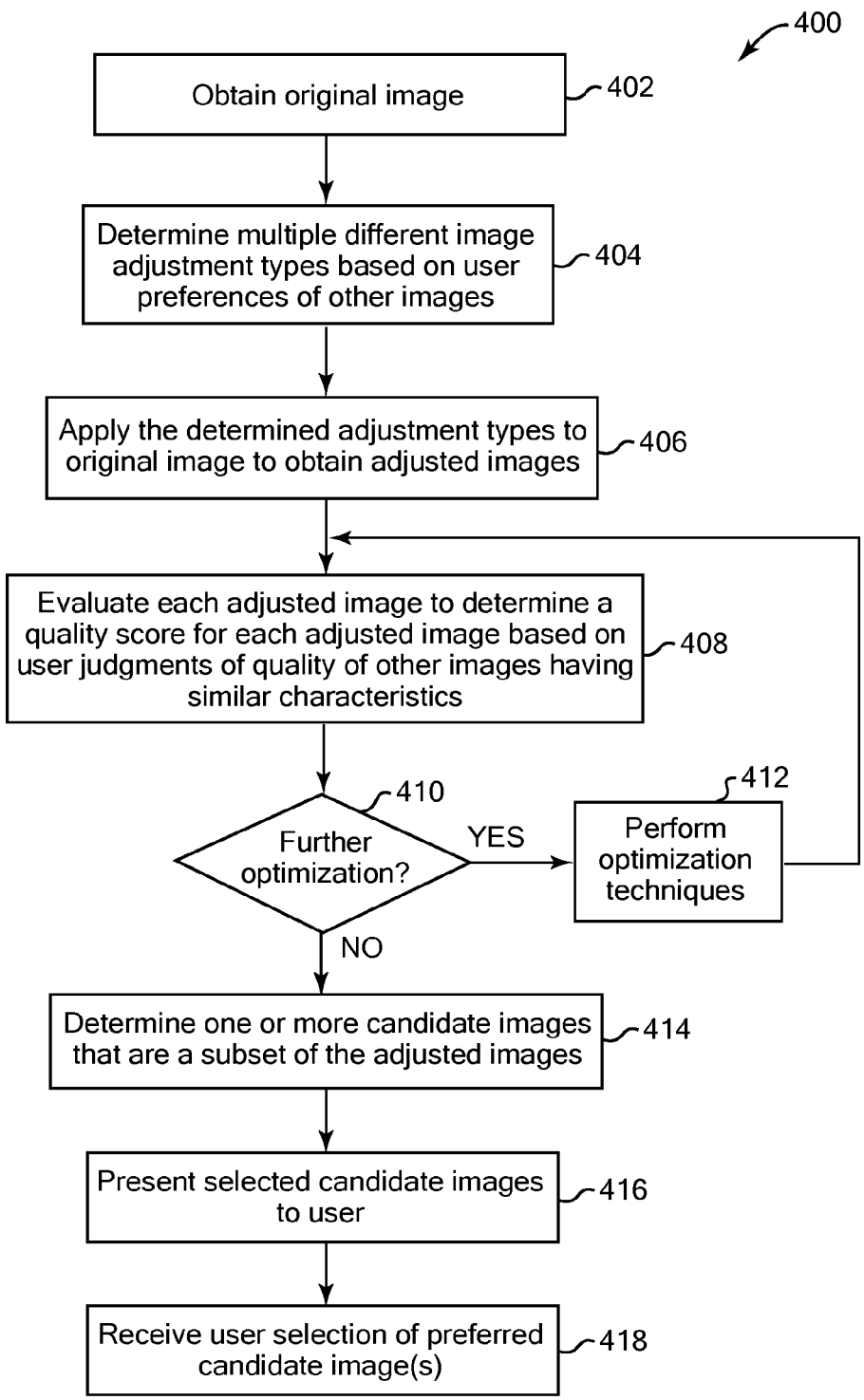
FIG. 4 is a flow diagram illustrating an example method of providing image candidates including determining different adjustment types and evaluating quality of adjusted images to determine the image candidates, according to some implementations.

FIG. 4 is a flow diagram illustrating an example method 400 of providing image candidates based on diverse adjustments to an image, in which the method determines different adjustment types and evaluates quality of adjusted images to determine the image candidates, according to some implementations. Method 400 can be implemented on one or more systems similarly as described above for method 300 of FIG. 3.

In block 402, the method obtains an original image, such as similarly described in examples above for FIGS. 2 and 3. In block 404, the method determines multiple different types of adjustments to apply to the original image based on preferences of users for adjustments to other images. The method can examine the preferences of users of the system, including preferences of general users as well as preferences of the particular user. For example, in some implementations, the determined adjustment types can be based on previous adjustments made by users to different visual form characteristics of images including brightness, contrast, saturation, exposure, highlights, shadows, clarity, vibrance, sharpness, and other visual form characteristics. Some implementations can also determine adjustment types based on previous ratings of and preferences for other images by users.

In some examples, the method can examine user data describing image adjustments that have previously been made or preferred by users for various images. For example, if method 400 is implemented on a social networking service, previous adjustments made to images by users of the social networking service can be examined in block 404. These users can be all users of the service, or a subset of users of the service that have previously agreed to have their image adjustments tracked by the service (or tracked by an application running within or connected to the service) to be used in evaluation such as in block 404. Furthermore, the users examined can be classified into different categories or groups. For example, one group of users can be all general users of the social networking service, such as users who have agreed to have their adjustments tracked. Another group can be "expert" users who are known to have some experience adjusting images successfully and to achieve better quality, and who may in some cases provide more extreme adjustments than general users. Another group can be the particular user who has initiated the method 400 and who will receive the resulting candidate images.

The previous preferred adjustments that are examined can be "successful" adjustments made by users. For example, successful adjustments can be adjustments accepted or approved by the users, and/or kept by the users for at least a predetermined minimum amount of time before the adjusted image is deleted or adjusted further.

The previous adjustments examined can be any adjustments to the visual characteristics of images, or a combination of types of adjustments. Certain combinations of characteristics may often have been adjusted by users for images, while other combinations of characteristics may not have been adjusted often or at all. For example, increasing a combination of contrast and saturation characteristics may tend to produce an effect in images that is garish, but adjusting contrast or saturation without the other may provide a favorable result, such that the first combination is not represented often in the user data while the latter two adjustments are commonly present. The user data describing the previous adjustments made by users over time can indicate which combinations of characteristic have been made most often as successful adjustments.

In some implementations, the user data describing previous successful adjustments made to images by users can be correlated with the visual content depicted in those images, allowing the method to detect patterns in adjustments based on the images' content. For example, the user data may indicate that images depicting persons are often adjusted by users to apply a negative clarity or sharpness (e.g., a blurriness) because it softens the skin of the person depicted. The type of user (general user, expert user, etc.) may also be correlated to adjustments. For example, the user data may show that general users may perform the negative clarity adjustment but expert users do not perform this adjustment. The particular user's own previous adjustments can also be correlated to the content depicted in the adjusted images. For example, if a particular user tends to apply a similar set of adjustment types to images that depict his or her children, and apply a different set of adjustment types to images depicting his or her spouse, then the method may be able to establish particular adjustment types correlated to specific people depicted in images if there is enough variance in the adjustments for these content types.

The previous successful adjustments to images made by the particular user can also be identified, and in some embodiments these can be assigned more weight than adjustments made by other users in determining which adjustments to use. This allows the method to tailor the types of adjustments to an individual's tastes. The method can infer the particular user's tastes for image adjustments by examining the images and adjustments that the user has previously approved in an environment such as a social networking service. The preferences of the user in selecting candidate images in previous iterations of the method 400 (as in block 412, described below) can be used.

In some implementations, the preferences of the user in other activities, such as rating and commenting on various images within the social networking service, can also be used in determining the different types of adjustments to use in method 400. For example, the particular user may have previously rated or commented positively on particular images from an expert user (such as a professional photographer). If that expert user's adjustments to images have been tracked, the method can examine those expert user's previous adjustments to determine which types of adjustments to images that the particular user prefers. Ratings and comments for images by other users can similarly be examined, such that adjustment types that are correlated with positive ratings and comments can be determined as being generally preferred by users.

By examining a sufficient number of previous user adjustments to images, patterns and preferences of users can be determined using machine learning techniques. For example, image adjustments identified from the user data can be clustered into groups or clusters having similar adjustment types by using histograms and/or other distributions. The identified adjustments can be clustered by the different combinations of characteristics that users previously have made, as well as the magnitudes of the adjustments users have made. The types of content depicted in the adjusted images can also be included in the clustered data. The content can be identified from descriptors such as tags having text descriptions input by users providing the images, or from labels provided by object recognition (including facial recognition) techniques that are used to identify the content of the images, such as generic description labels or more specific labels (e.g., describing make and model of a car). A representation can be constructed for each previously adjusted image that includes, for example, the visual form characteristics that have been adjusted, the magnitudes of the visual characteristics before and after adjustments were made, and the content in the adjusted image. These factors together determine a representation for an image and the same or similar representations for other images can be grouped into clusters. Each cluster can include many characteristics grouped together as having been similarly adjusted by users. For example, the clustering can allow the system to find certain patterns of adjustments that commonly occur together at particular common magnitudes, and/or find that particular image characteristics are changed consistently with each other across many different images and users. For example, the user data may indicate that users do not tend to or prefer to adjust all the visual characteristics of images, such as contrast.

Weighting can also be applied to the examination and/or clustering of the user data. Some weighting can be based on the particular user's previous image adjustments and/or the particular user's preferences as indicated by that user's actions. For example, such actions can include the user's social signals within the social networking service. For example, if the particular user has tended to choose particular adjustments that also tend to be made by a particular expert user, those types of adjustments can be weighted more so as to be seen as more important in the clustered data. The user data may show that the particular user has rated that expert user's photographs highly, e.g., by giving an approval or high rating on the expert user's profile or content activity stream in the social networking service or by commenting favorably on the expert user's posted images, and so those adjustment types can be weighted higher than other users' adjustments. If the particular user has rated certain types of content in images more favorably, such as natural landscapes or certain types of activity, then that type of content can be weighted higher.

In some implementations, this examination and clustering of user data to identify previous preferred image adjustments can be performed each time the method needs to determine adjustment types for an original image. In other implementations, this processing can be performed once or periodically, and the method can use previously-determined identifications of preferred image adjustments in the implementation of the method 400.

By examining the user data and identifying the preferred image adjustments made by users, the method determines which image adjustment types should be included in the set of different adjustment types to be applied to the original image. These selected adjustment types can include the most preferred image adjustments types by users of the system and the method can exclude adjustment types not preferred. The most preferred image adjustments can be the most commonly occurring successful adjustments previously made by users. Furthermore, preferred adjustment types for images depicting content the same or similar to content depicted in the original image can be selected. In addition, adjustment types preferred by particular favored types of users can be selected, such as expert users. The selected adjustment types can also include the most common adjustment types preferred by the particular user, including adjustment types used by the particular user based on the content in the original image, based on preferences for the particular user for images from certain other users or types of users, etc. The method can give the preferences of the particular user additional weight to allow selection of image adjustments consistent with the particular user's tastes. In some implementations, an overall score or rating can be assigned to each adjustment type which is based on a sum of individual scores contributed to by factors such as commonality of adjustments in user data, particular user preferences, correlation to visual characteristics, and weighting as described above, and the highest scoring adjustment types are selected. Some embodiments can select a large number of adjustment types to apply, such as hundreds or thousands.

Referring still to FIG. 4, in block 406, the method applies the determined image adjustment types to the original image to obtain multiple adjusted images. For example, each adjustment type that was selected based on user preferences in block 404 can be applied to the original image to obtain a corresponding adjusted image for that adjusted type. In some examples, the produced adjusted images can be stored on one or more storage devices accessible to the system, such as on the social network database 106.

In block 408, the method evaluates each adjusted image to determine a quality score for each adjusted image. The quality score can be based on previous selections of other images having one or more same or similar characteristics as the adjusted image. In some implementations, the quality score is a score or rating of the overall visual quality of an image and indicates a probability that an average person would find the image pleasing, e.g., find an image with a better (e.g. higher) quality score more pleasing than another image having a worse (e.g., lower) quality score. For example, the previous selections of images by the persons can reflect their judgments as to which images they preferred, e.g., appealed to them more. Such judgments and selections can have been made by people in general, or a specific group such as users of the social networking service and/or users of other online or Internet services.

In some implementations, the quality score is determined by one or more quality evaluation techniques that use results derived from selections and judgments of multiple persons evaluating various images for general visual quality. For example, the quality score for a given image can be based on one or more attribute scores. In various implementations, the attribute scores of a given image can be based on multiple attributes. For example, attributes may include the visual form characteristics described above such as such as brightness, contrast, sharpness, etc. In some implementations, attributes can include content depicted in the image such as recognized objects, faces of people, landmarks, etc. By basing an overall quality score of each image on various attribute scores, the method is able to determine which of the adjusted images have a high probability of being interesting and appealing.

In some implementations, an attribute score can be based on visual characteristics of an image such as motion blur, poor exposure, poor contrast, etc. For example, such attribute scores can be implemented as negative values if they reflect attributes that lower the quality of a given image. Conversely, an attribute score can be implemented as a positive value if the image has been found to have a high quality with good contrast or brightness, etc. The evaluation of whether a visual characteristic is poor or good can be based on previous subjective selections and judgments by people who have evaluated various images and subjectively rated the images based on their perceptions. Such selections of images, and by inference any images not selected, indicate which images and characteristics the persons preferred and find of good quality. Data reflecting the persons' selections and judgments can be examined by the system and correlated to various characteristics of the images. For example, after numerous such users have rated images (for example, choosing which of two images is more appealing), the visual characteristics of the more highly rated images can be examined to determine ranges of such visual characteristics that produce higher quality. In some implementations, each adjusted image can, as a result, be provided with individual attribute scores based on having particular visual quality attributes. The attribute scores can be summed or otherwise combined to obtain an overall quality score for that adjusted image.

Some implementations can evaluate and provide attribute scores for content depicted in the image. Content can be identified using user-entered metadata such as tags, and/or by using object and facial recognition techniques as described above. For example, an attribute score may be based on facial attributes. In some examples, the system can detect one or more faces in an image, and detect associated facial features. For example, detected facial features may be indicative of emotions (e.g., smiling, frowning, etc.), eye and/or head direction, face size, gender, etc. The system can assign a facial attribute score based on one or more policies. For example, the system can associate a higher facial attribute score with images showing faces that have a higher probability of being appealing to a viewer, such as, in some implementations, faces showing more emotion, happy emotions, showing eyes and/or mouth that are open, showing babies, etc. Some implementations can provide an attribute score based on landmark attributes, which can be based on one or more detected landmarks in an image, such as a higher landmark attribute score for images showing landmark features that are well-known and/or popular landmarks. As described above, the determination of which facial attributes and landmark attributes indicate a higher quality can be determined based on multiple persons' selections and judgments of other images, where the facial and landmark content depicted in highly-rated images are clustered and noted for use in quality evaluation of other images.

Evaluating image quality based on content attributes can be used in block 408 even if the different adjusted images all depict the same content. For example, one or more of the adjustments to the original image may cause the depicted content to become unclear or obscured. In one example, for an original image depicting a smiling human face, one adjustment may adjust the contrast and/or brightness such that the smile of the face is washed out and not readily detectable. Accordingly, the image quality evaluation can provide a lower or negative attribute score for this adjustment because a smile was not found in the adjusted image, in comparison to adjusted images that left the smile clearly visible and are evaluated to provide a higher facial attribute score and a higher overall quality score.

Some example implementations can use machine learning techniques in the evaluation of image quality. In some implementations, the method can assign particular weight to adjusted images having features associated with machine learning or other regression techniques including model training based on human-labeled preferences. For example, the method can extract general-purpose image content features and compute a visual quality score based on these content features. In some implementations, the method can calibrate various attribute scores based on signal vectors that contain multiple components (e.g., contrast score, brightness score, sharpness score, facial attribute score, landmark attribute score, etc.), where the signal vectors are based on machine learning or other regression techniques.

Furthermore, known previous selections and judgments of the particular user can be used in the evaluation of quality. For example, if the image quality evaluation would normally score high contrast images very low, but the previous history of the particular user shows that the particular user prefers images with high contrast, then the contrast score can be changed based on the particular user's judgment. A produced overall quality score can be overridden with a score or modified by a score based on the particular user's preferences.

Referring still to FIG. 4, in block 410, the method can check whether further optimization is needed for the adjusted images. In some implementations, the adjusted images scored for overall quality in block 408 can be additionally processed and/or modified for further optimization and further increased quality when evaluated by the evaluation process of block 408. The check in block 410 can be whether sufficient optimization has been performed on the adjusted images. In some implementations, this decision can be based on whether the quality scores resulting from block 408 are sufficient, such as being greater than a predetermined threshold or greater than a dynamic threshold based on user preferences or other factors involved in the quality evaluation process. If sufficient optimization has been performed, then the method continues to block 414, described below.

If sufficient optimization is not found in block 410, then in block 412, the method can apply one or more optimization techniques to the adjusted images. In some embodiments, these techniques can include modifying the adjusted images with the quality evaluation of block 408 as an objective function to evaluate the quality of the adjusted image after modification. For example, block 412 can modify the image and the method returns to block 408 to evaluate the modified image.

The modification to the adjusted image performed in block 412 can be any of a variety of modifications. In some implementations, the modification includes adjusting visual image characteristics to improve the quality of the adjusted image relative to the average adjustment of these characteristics as evaluated by the quality evaluation process. In one example, the optimization process can have access to the data and policies used by the quality evaluation process and knows that further adjusting a brightness (or other visual characteristic) of the adjusted image will improve the overall quality score provided by the quality evaluation process. Thus the optimization process can adjust the visual characteristics by particular amounts. Other characteristics can be similarly adjusted to improve the overall quality score when further evaluated by the quality evaluation process. The optimization techniques can using any number of known techniques, including simplex methods, stochastic gradient ascent, and/or second order methods.

Once the one or more optimization techniques have been applied, the process returns to block 408 and the quality evaluation process re-evaluates the adjusted image with the optimized modifications. Another overall quality score is provided by the quality evaluation process, and the method again checks in block 410 whether further optimization is needed. For example, further optimization can be continued if the new quality score is still not as high as desired by a particular implementation of the method. Thus the optimization can be performed iteratively. Some implementations can provide a relatively small number of iterations, e.g., due to the optimization process knowing how the quality evaluation process determines the quality score. Once the optimization is found to be sufficient in block 410, the method continues to block 414.

In block 414, the method selects one or more adjusted images as candidate images that have the highest overall quality scores resulting from the blocks described above. In some implementations, the number of adjusted images can be a large amount, such as hundreds, thousands or more, and the number of selected candidate images can be significantly lower, such as on the order of 5 or 10 in one nonlimiting example. Other implementations can provide a different number of adjusted images and/or candidate images. Some implementations can select a single candidate image from the adjusted images. In some implementations, the number of candidate images produced can be predetermined based on user preferences or system settings, or can be dynamically determined based on original image characteristics, distribution of resulting scores, number of adjustment types applied, and/or other factors.

In some implementations, the method can rank the adjusted images based on their respective quality scores. For example, the method may aggregate the adjusted images to compare them against each other and generate a global ranking of the adjusted images based on their respective overall quality scores. In various embodiments, the method can select the appropriate number of highest ranking adjusted images to be the candidate images.

Some implementations can apply one or more diversity metrics to the higher-ranking adjusted images or candidate images to ensure that the selected candidate images are different in visual appearance from each other by some minimal degree and not too similar to each other. Diversity in the adjusted images can be measured and provided in any of a variety of techniques. For example, non-maximal suppression can be used, in which the method examines the adjusted image having the highest quality score and compares the adjusted images that are next in the quality score ranking. For a later-ranked image, images of both higher and lower ranks surrounding the image can be compared. In some examples, similarity can be determined between two images by measuring between visual characteristics of the images, such as visual form, content, and/or pixel value characteristics, to determine if one or more characteristics of the two images have a value within a predetermined range of values of each other. If another image is found to be similar, then the method can disregard that other image, and keep disregarding images if they are too similar up to a distance threshold. The process can find local maxima, such that the selected adjusted images have better quality scores than other images ranked near them within some neighborhood. For example, principal component analysis can be performed to present a wider variety of candidate images to the user, by selecting candidates with local optima along the highest variance principle components. The final candidates can be different in quality scores. In another example, the method can impose a maximum distance between the ranked images based on similarity between the candidate images. In a similar example, if two adjusted images are too similar to each other, one of the images (such as the lower ranking image) can be removed from the selected subset of candidate images.

In block 416, the method presents the candidate images to the particular user (and/or other users in some implementations), as described above for FIG. 3. In block 418, the method can receive one or more user selections of the candidate images by the particular user. For example, the particular user can select the candidate image that is most preferred by the user. In some implementations, the user can rank the candidate images as described with reference to FIG. 3. The user's selections can be stored by the system and used to improve the method 400. For example, in some implementations the user's selection can be used as a factor in determining adjustment types in block 404 and/or evaluating adjusted images in block 408 for other original images processed by method 400 (and/or for a single original image re-processed by the method 400). For example, the particular user selection of a certain candidate image can increase a weight or selection score for selecting the associated adjustment type in block 404, and/or increase the quality score of the candidate image as used in the evaluation of block 408, such that the associated adjustment type may be selected for use in future iterations of method 400 even though it would otherwise have been assigned lower scores than other adjusted images. This feature allows the system to adapt to selections of the particular user over time.

In some implementations, the adjustments made to the original image in block 404 can be visual form characteristics that are visual style adjustments, such as to color scheme (black and white, sepia tones, etc.), and/or changing of other image characteristics to provide a particular style. In such implementations, the method 400 can be used similarly as described above for adjustment of visual form characteristics such as brightness, contrast, sharpness, etc. In some implementations, the stylistic adjustment types applied to the original image in block 406 can be any or all different style filters or style presets available and known to the system and thus adjustment types need not be determined by examining user data in block 404. In other implementations, one or more of the stylistic adjustment types can be determined by the system based on user data indicating the preferences of users, as well as based on analysis of the visual form and/or content of the original image (e.g., some stylistic filters may be known to be disliked by general users and/or the particular user, or may be unused with particular depicted content, and may be disregarded).

Since visual style adjustments may provide stylistic changes to an image, in some implementations the evaluation of quality in block 408 for stylistic adjusted images can be more an evaluation of quality based on subjective stylistic preferences and judgments of people and the particular user, rather than an evaluation of quality based on correcting characteristics as can be the case with the visual form characteristics described earlier (e.g., correcting brightness or contrast values that obscure image detail). Thus, the image quality evaluation of block 408 can provide higher quality scores based on the selections of stylistic adjustments that other people have previously preferred in images, and/or based on particular content that was highly rated for particular stylistic adjustments.

Figure 5:
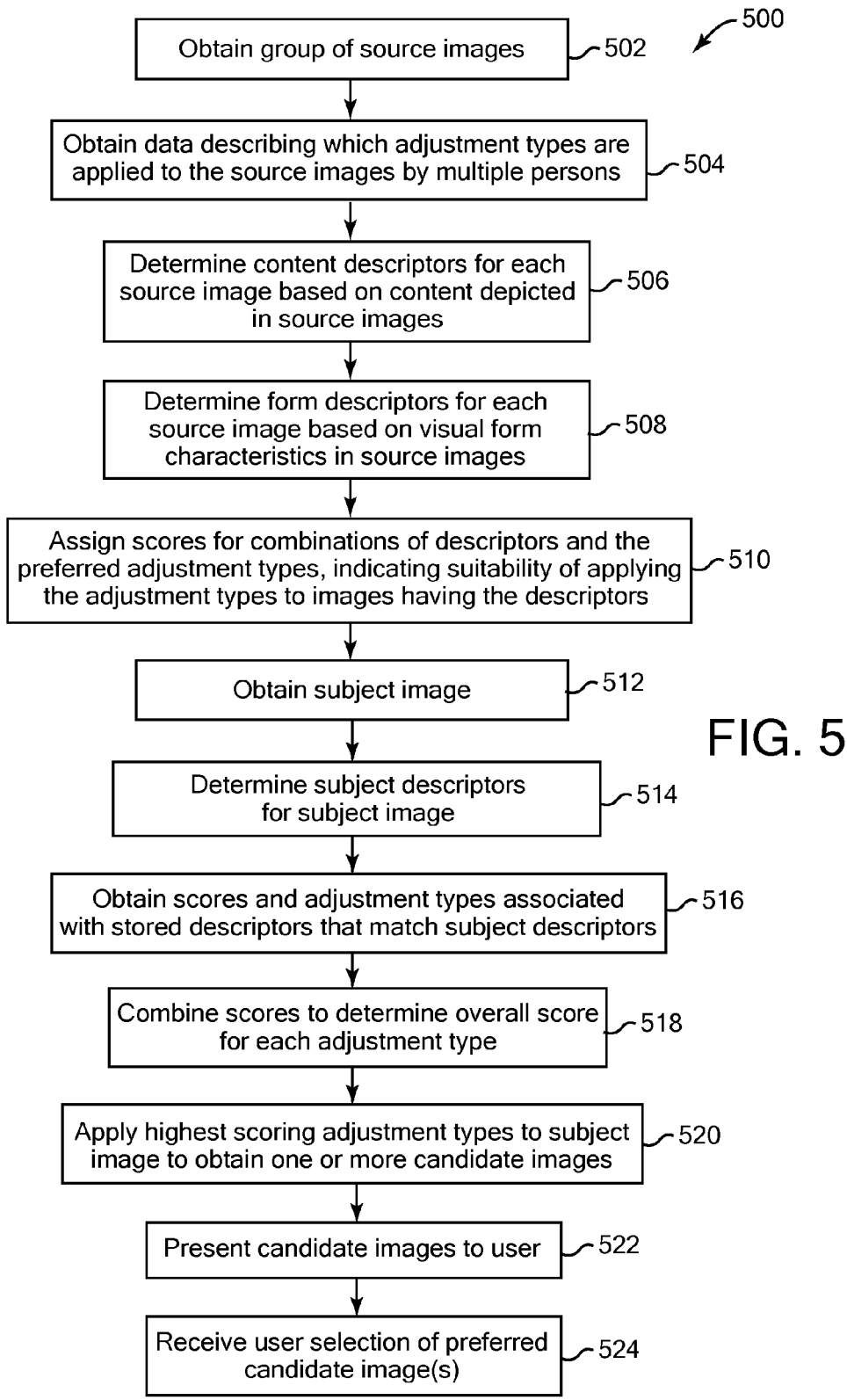
FIG. 5 is a flow diagram illustrating an example method of providing image candidates in which source images are pre-processed to determine references for evaluation of adjustment types.

FIG. 5 is a flow diagram illustrating an example method 500 of providing image candidates based on diverse adjustments to an image, in which source images are pre-processed to determine references for evaluation of adjustment types. Method 500 can be implemented on one or more systems similarly as described above for method 300 of FIG. 3.

In general, method 500 provides pre-processing of images to determine correlations between adjustment types and visual characteristics of images. These correlations can be based on image and adjustment type selections and/or other inferred judgments of persons who have determined which adjustment types they prefer for particular images having particular visual characteristics. In the described example method, visual characteristics such as content and form characteristics are correlated with adjustment types using descriptors such as labels which can be referenced in later evaluation of new images. However, other implementations can use other methods and techniques to determine the relationships between and to correlate adjustment types and image characteristics for use in later evaluation of images.

In block 502, the method obtains a large group of source images. In some implementations, these source images can be wide in variety, such as depicting a large variation of content, having a large variation of visual characteristics (brightness level, contrast level, etc.), and can be provided by a wide variety of sources. In some examples, source images can be obtained from different users or accounts of a social networking service who have previously agreed to have their posted images used for the method 500 or similar methods. The number of source images can vary depending on the implementation. For example, some implementations can use hundreds or thousands of source images or more, such as 5,000 images in one nonlimiting example.

In block 504, the method obtains data describing which adjustment types that are applied to the source images by multiple persons. In some implementations, the adjustment types applied to the source images can be tracked and stored by the system for later reference. For example, each participating person may have selected to apply one (or more) of the adjustment types to each source image, where the selected adjustment type was judged by that person to provide an adjusted image that the person prefers. In some implementations, experts or other people with image adjusting experience can be used to select which one or more of the adjustment types they prefer to apply to each of the source images. In other examples, general users may have selected the adjustment types to apply. Thus, block 504 can obtain data describing results in which different persons have applied preferred adjustment types to the same set of source images, providing a distribution as to which adjustment types tend to get applied to the source images. Since multiple persons apply one or more adjustments to each source image, this provides a larger number of adjustment types than the number of source images. In some implementations, the selected image adjustment types used by the persons can already be known, such as a set of known stylistic filters and/or presets which change the visual style of an image. Other adjustment types can also be selected for application by the persons, such as adjustments or combinations of adjustments for brightness, contrast, or other visual characteristics.

In block 506, the method creates one or more content descriptors from each source image based on content depicted in the source images. In some implementations, the descriptors can be labels that describe the depicted content. For example, the labels can be generated by the system using one or more object identification techniques, including facial recognition techniques. In some implementations, the system can use an object recognizer that can provide labels (or keywords) based on analysis of the content, where the labels can be provided in different degrees of precision. For example, a vehicle object in an image can be described by several labels including, "vehicle," "car," the make of the car, and the model of the car, where each label is successively more precise (and less accurate and/or confident, for example). A label can describe a face of a person that is recognized using facial recognition techniques. Object recognition techniques other than facial recognition techniques can also be used to recognize any types of objects, including landmarks, landscape or location features, vehicles, tools, food, clothing, devices, or other items or objects. Some implementations can employ character recognition techniques to identify writing in the images, which can be used to recognize brand names, logos, locations, and other objects in the source images. In some implementations, the content descriptors can be determined from identifiers or other metadata associated with the images and input by users, such as tags providing names or descriptions applying to the content depicted in the source images.

In block 508, the method creates one or more form descriptors from each source image based on visual form characteristics of the source images. For example, in some implementations, the descriptors can include one or more statistics indicating the values and/or distribution of visual form characteristics in the pixels the source image, such as maximum, average, variance, and/or median values for characteristics such as brightness, contrast, saturation, exposure, etc. A descriptor can also be created to describe each cluster of similar characteristics in the image that is over a predetermined size in a histogram or other distribution, in some implementations. Similar form descriptors can also be used in implementations in which the adjustment types are visual stylistic adjustments and/or other types of adjustments to visual characteristics. In some implementations, other characteristics of the source images can be used to provide descriptors.

In block 510, the method assigns scores for combinations of the preferred adjustment types and descriptors based on the correlation of adjustment types and descriptors provided from the above blocks. Each score indicates the suitability of applying a particular adjustment type to an image that has a particular associated descriptor. The score can be determined based on organizing and analyzing the data derived from the application of adjustment types to source images described above as well as the data providing the determined descriptors from these images. For example, in some implementations, a machine learning process can be used to evaluate the data and determine the scores based on the occurrences of adjustment types and descriptors. The evaluation of the descriptors from the source images allow a system to draw inferences as to which combinations of image adjustment types and descriptors most often occur in the data. The evaluation process can thus build a model of which adjustments have provided the most preferred resulting images that include the descriptors created from the source images. In some implementations, the method can store each descriptor along with an associated adjustment type and an associated score for that combination of descriptor and adjustment type. For example, this data can be stored in a database or other construct.

In one example, the method can examine the data to determine that, in general, when the median brightness of images is high (such as in a $70^{th}$ percentile of a histogram range of brightness values) and the variance is very low such that there are few occurrences of brightness values outside of that median, then people tend to apply a sepia tone adjustment to an image more often than if the brightness values were more evenly distributed throughout the possible range. A high correlation of this combination causes the method to assign a higher score for a combination of the sepia tone adjustment and a descriptor describing median brightness value within a range of the median value found in the user data, and assign a lower score to a combination of sepia tone adjustment and descriptors describing other median brightness values. Such scores can be assigned for each combination of the sepia tone adjustment and each brightness descriptor from the form descriptors obtained in block 508 from the source images.

In another example, the method can examine user data to determine a correlation indicating that people generally prefer a sepia tone adjustment for images depicting people, but not for images depicting landscapes (in which people want more natural colors to be used). This causes the method to assign a higher score for the combination of the sepia tone adjustment and a descriptor indicating the depicted content is of people. This score can be assigned for each combination of the sepia tone adjustment and each people descriptor in the group of content descriptors obtained in block 506 from the source images. Furthermore, the method can assign a lower score to the combination of the sepia tone adjustment and each descriptor describing content including a landscape (such as mountains, lakes, etc.). Thus, the scores can indicate what form descriptor for images generally leads users to apply a sepia tone adjustment to that image.

In some implementations, the method can perform principal component analysis on the data to reduce the dimensionality of the data. The data set can include the results of many different types of descriptors combined with many adjustment types, resulting in many dimensions. Principal component analysis can be used to find principal components, thus reducing the dimensionality to provide smaller number of dimensions to work from in the data. A variety of techniques (such as clustering and principal component analysis) can take the large number of components or dimensions and compress them into fewer components that occur most often, resulting in data more amenable to machine learning. This can also increase the overall efficiency of the process at runtime, with a smaller set of data to apply.

Blocks 502-510 can form a pre-processing stage of method 500 in which various source images are processed to form a machine learning model of associated descriptors, adjustment types, and scores for adjusted images derived from the source images. The remainder of method 500 can be oriented to using the correlations described in the pre-processed data to determine adjusted images for a new original image.

In block 512, the method obtains an original image, which can be referred to as a "subject image" in the context of method 500. In various implementations, the subject image can be selected by a particular user for processing or uploaded by the particular user, or the system can scan content and locate the subject image or obtain the subject image in other ways. In block 514, the method determines subject descriptors for the subject image. For example, the method can perform object recognition and/or use user-inputted metadata to determine the content in the subject image and provide content descriptors similarly as described above for block 506. The method can perform tonal analysis and other analysis of the subject image to determine the visual form characteristics of the image and to provide form descriptors, similarly as described above for block 508.

In block 516, the method obtains scores associated with stored descriptors that match the subject descriptors determined in block 514. For example, for each subject descriptor determined in block 514, the method looks for a stored matching descriptor generated from the source images in blocks 506 and 508. Each stored matching descriptor has an associated stored score for each available adjustment type as applied to an image having that descriptor. Thus, each matching descriptor allows a number of associated adjustment types and their associated scores to be retrieved.

In block 518, the method combines the scores associated with each matched descriptor and associated adjustment type to determine an overall score for each of those adjustment types. For example, if a first descriptor matches a descriptor in the database, the associated score for each available adjustment type is retrieved. A second matching descriptor also causes the associated scores and adjustment types to be retrieved. For each adjustment type, the scores associated with the first descriptor and the second descriptor can be added together to form an overall score for the adjustment type as applied to the subject image, based on the descriptors derived from that subject image. Other implementations of providing an overall score can also be used. For example, the overall score can be obtained by combining multiple descriptors to provide a score that is associated with the multiple descriptors.

In a more specific example, a particular subject image provides a first descriptor describing a face type of content, a second content descriptor describing famous location content such as Paris, and a third descriptor describing a tonal distribution for brightness in the subject image. The first descriptor for face content is matched to two descriptor entries in the stored data from the source images. The first entry provides an associated adjustment type of changing the brightness within a certain range and an associated score indicating the suitability of applying that adjustment type to images having face content. The second entry provides an associated adjustment type that applies sepia tones to images, and a score indicating the suitability of applying that adjustment type to images having face content. The second descriptor for the Paris location is similarly matched to two entries that have the same adjustment types with other associated scores, and likewise the third descriptor for the tonal distribution. For each of these adjustment types, the method can sum the scores obtained from each of the three descriptors to obtain an overall score for that adjustment type.

In block 520, the method applies the highest-scoring adjustment types to the subject image to produce one or more candidate images. Similarly to the blocks 306 and 414 of FIGS. 3 and 4, respectively, the method can determine which of the adjustment types have the highest scores, rank the adjustment types, and apply the highest ranking adjustment types to the subject image to produce adjusted images that are the candidate images. In some implementations, one or more diversity metrics can be applied to either the ranked adjustment types and/or to produced candidate images to provide candidate images having a minimum visual difference between each other, similarly as described above for block 414. For example, principal component analysis can be performed to present a wider variety of candidate images to the user, by selecting candidates with local optima along the highest variance principle components. In some implementations, the number of candidate images produced can be predetermined based on user preferences or system settings, or can be dynamically determined based on subject image characteristics, distribution of resulting scores, number of adjustments applied, and/or other factors.

In block 522, the method presents the candidate images to the particular user (and/or other users in some implementations) and/or stores the candidate images for later viewing or use by the particular user. In block 524, the method can receive one or more user selections of the candidate images by the particular user as preferred image(s). For example, the particular user can select the candidate image that is most preferred by the user. In some implementations, the user can rank the candidate images as described previously. The user's selection can be stored by the system and used in some implementations as a factor in determination of the adjustment types used and candidate images produced. For example, each time the particular user selects a particular candidate image in block 522, the stored score for that adjustment type used to produce that candidate image can be increased for those stored descriptors that were found in the subject image. In some implementations, each time the particular user selects a candidate image that depicts a named face, a new descriptor can be created for that face (if it does not exist already) and the score associated with that descriptor and the selected adjustment type can be increased. This allows future evaluation of images having that face to score the same image adjustment type more highly so that the adjustment type will more often be included in candidate images. Thus, by incorporating user selection of candidate images, the method can adapt and learn user's preferences for which adjustment types to apply to images having particular visual form and/or content characteristics.

It should be noted that the blocks described in the methods of FIGS. 3, 4, and 5 can be performed in a different order than shown and/or simultaneously (partially or completely) with other blocks, where appropriate. In some implementations, blocks can occur multiple times, in a different order, and/or at different times in the methods. In some implementations, method 500 can be implemented, for example, on a server system 102 as shown in FIG. 1. In some implementations, one or more client devices can perform one or more blocks instead of or in addition to a server system performing those blocks.

Figure 6:
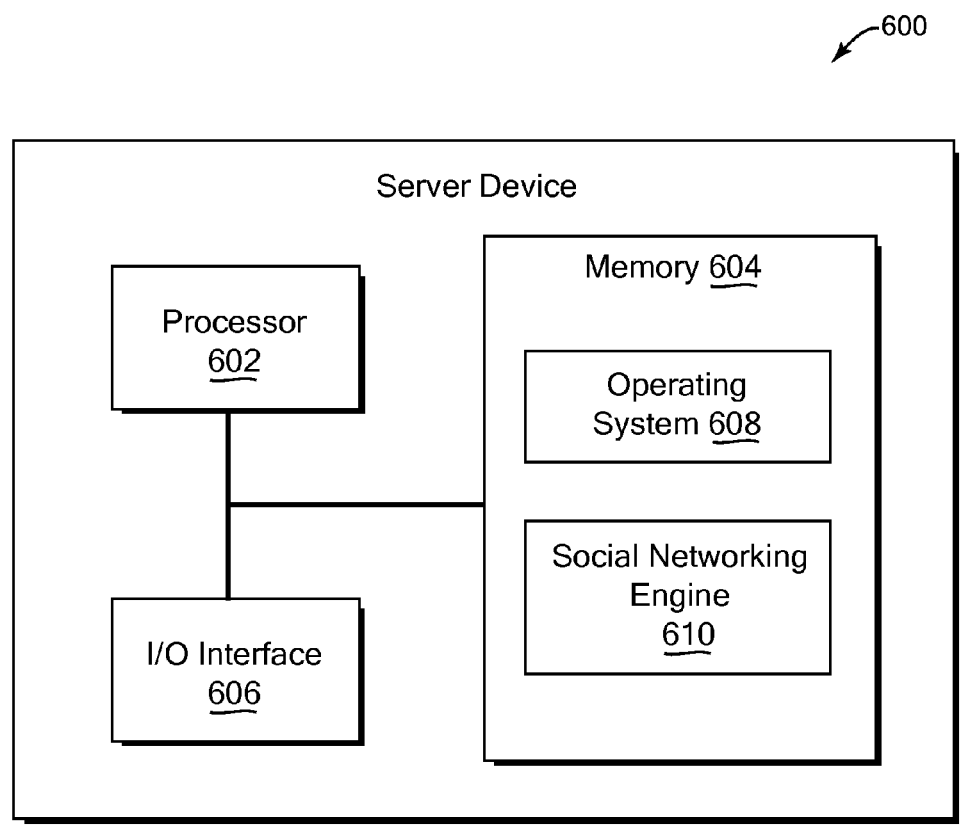
FIG. 6 is a block diagram of an example device which may be used for one or more implementations described herein.

FIG. 6 is a block diagram of an example device 600 which may be used to implement some implementations described herein. In one example, device 600 may be used to implement server device 104 of FIG. 1, and perform appropriate method implementations described herein. Server device 600 can be any suitable computer system, server, or other electronic or hardware device. For example, the server device 600 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 600 includes a processor 602, a memory 604, and input/output (I/O) interface 606.

Processor 602 can be one or more processors or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608 and a social networking engine 610. In some implementations, the social networking engine 610 can include instructions that enable processor 602 to perform the functions described herein, e.g., some or all of the methods of FIGS. 3, 4, and/or 5. Any of software in memory 604 can alternatively be stored on any other suitable storage location or computer-readable medium. In addition, memory 604 (and/or other connected storage device(s)) can store privacy settings, content, and other data used in the features described herein. Memory 604 and any other type of storage (magnetic disk, optical disk, magnetic tape, or other tangible media) can be considered "storage devices."

I/O interface 606 can provide functions to enable interfacing the server device 600 with other systems and devices. For example, network communication devices, storage devices such as memory and/or database 106, and input/output devices can communicate via interface 606. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, server device 600 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 600, such as processor(s) 602, memory 604, and I/O interface 606. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
   determining a plurality of different image adjustment types based on preferences of a user for previous adjustments to one or more images;
   applying, using a hardware processor, the different image adjustment types to an original image to produce a plurality of different adjusted images;
   evaluating each adjusted image to determine a score for each of the adjusted images, each score being based on previous stored selections or judgments by the user of other images;
   determining one or more candidate images that are a subset of the adjusted images and one or more of which have the highest scores; and
   enabling the one or more candidate images to be presented to the user.

2. A method comprising:
   determining a score for each of a plurality of different image adjustment types using a hardware processor, wherein each score is based on previous selections or judgments by a user of a plurality of images; and
   determining one or more candidate images for presentation to the user, each candidate image obtained from applying one of the different image adjustment types to an image, wherein the one or more candidate images are determined based on one or more of the image adjustment types having the best scores.

3. The method of claim 2 further comprising applying the plurality of different image adjustment types to the image to produce a plurality of different adjusted images, wherein the one or more candidate images are a subset of the different adjusted images having the best scores.

4. The method of claim 2 wherein the different image adjustment types perform adjustments to image visual characteristics that include one or more of: image sharpness, brightness, contrast, exposure level, shadow level, highlight level, clarity, vibrance, and saturation.

5. The method of claim 2 wherein the different image adjustment types include a plurality of stylistic filters or presets that each adjust the image to a different visual style.

6. The method of claim 2 wherein each score is also based on selections of a plurality of images by a plurality of persons.

7. The method of claim 2 further comprising determining the plurality of different image adjustment types to apply to the image.

8. The method of claim 7 wherein determining the different image adjustment types includes examining previous adjustment types applied to image visual characteristics in other images that the user has previously preferred or approved, and including the previous adjustment types in the image adjustment types for the image.

9. The method of claim 7 wherein determining the different image adjustment types includes:
examining previous adjustment types applied to image visual characteristics of processed images by a plurality of users of a social networking system; and
including the previous adjustment types in the image adjustment types for the image.

10. The method of claim 7 wherein determining the different image adjustment types includes examining combinations of multiple image visual characteristic adjustments that were previously preferred by the user in the other images and designating each of one of more of the combinations as its own adjustment type.

11. The method of claim 7 wherein determining the different image adjustment types includes:
determining content depicted in the image,
searching for stored matching depicted content from a plurality of images,
determining previous image adjustment types applied to the plurality of images, and
including the previous image adjustment types in the different image adjustment types.

12. The method of claim 7 wherein determining the different image adjustment types includes:
clustering data representing a plurality of previous image adjustment types applied by one or more users of a social networking service; and
using the clustered data to determine one or more of the different image adjustment types.

13. The method of claim 2 wherein the scores are based on data describing selections indicating preferences of the user for characteristics of images, wherein the characteristics include types of content depicted in images and visual form characteristics of images.

14. The method of claim 2 wherein each of the scores is associated with one of the adjusted images, and further comprising using an optimization technique to further iteratively adjust at least one of the adjusted images to increase the score of the at least one adjusted image.

15. The method of claim 2 further comprising applying one or more diversity metrics to the plurality of different adjusted images, and wherein the determining the one or more candidate images includes using results of the applying the diversity metrics such that the determined one or more candidate images are different in visual appearance from each other by a specified degree.

16. The method of claim 2 wherein the applying of a plurality of different image adjustment types and the determining a score of each image adjustment type are performed for a plurality of images as pre-processing, and further comprising:
obtaining a subject image, and
applying a plurality of the different image adjustment types to the subject image as subject adjustment types, wherein the subject adjustment types are determined based on the scores of one or more of the adjustment types that were commonly applied to the plurality of images having one or more visual characteristics similar to visual characteristics of the subject image, and
wherein the one or more candidate images are derived from the applying of the subject image adjustment types to the subject image.

17. A system comprising:
a storage device; and
at least one hardware processor accessing the storage device and operative to perform operations comprising:
determining a score for each of a plurality of different image adjustment types using a hardware processor, wherein each score is based on previous selections or judgments by a user for a plurality of images; and
determining one or more candidate images for presentation to the user, each candidate image obtained from applying one of the different image adjustment types to an image, wherein the one or more candidate images are determined based on one or more of the image adjustment types having the best scores.

18. The system of claim 17 further comprising applying the plurality of different image adjustment types to the image to produce a plurality of different adjusted images, wherein the one or more candidate images are a subset of the different adjusted images having the best scores.

19. The system of claim 17 wherein the operations further comprise determining the plurality of different image adjustment types to apply to the image, including:
examining previous adjustment types applied to image visual characteristics in other images that the user has previously preferred or approved, and including the previous adjustment types in the image adjustment types for the image.

20. The system of claim 17 wherein the scores are based on data describing selections indicating preferences of the user for characteristics of images, wherein the characteristics include types of content depicted in images and visual form characteristics of images.

* * * * *